United States Patent
Kim et al.

(10) Patent No.: US 8,036,691 B2
(45) Date of Patent: Oct. 11, 2011

(54) METHOD FOR DATA TRANSMISSION IN A RADIO COMMUNICATION SYSTEM AS WELL AS RADIO STATION AND RADIO COMMUNICATIONS SYSTEM

(75) Inventors: Jee Hyun Kim, München (DE); Egon Schulz, München (DE); Wolfgang Zirwas, München (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 373 days.

(21) Appl. No.: 12/226,001

(22) PCT Filed: Mar. 30, 2007

(86) PCT No.: PCT/EP2007/053123
§ 371 (c)(1), (2), (4) Date: Apr. 8, 2009

(87) PCT Pub. No.: WO2007/113265
PCT Pub. Date: Oct. 11, 2007

(65) Prior Publication Data
US 2009/0221315 A1     Sep. 3, 2009

(30) Foreign Application Priority Data
Apr. 3, 2006   (EP) .................................. 06007061

(51) Int. Cl.
*H04B 7/00* (2006.01)

(52) U.S. Cl. ..................... 455/517; 455/524; 455/278.1; 455/272; 455/277.1; 455/277.2

(58) Field of Classification Search ................. 455/517, 455/524, 525, 550.1, 90.1, 403, 278.1, 272, 455/277.1, 277.2, 269
See application file for complete search history.

(56) References Cited

U.S. PATENT DOCUMENTS

| | | | |
|---|---|---|---|
| RE39,980 E * | 1/2008 | Dent | 370/335 |
| 7,519,346 B1 * | 4/2009 | Rilling | 455/278.1 |
| 7,711,072 B2 * | 5/2010 | Doi | 375/319 |
| 7,937,057 B2 * | 5/2011 | Kishigami et al. | 455/278.1 |
| 2003/0054828 A1 | 3/2003 | Dent | |
| 2004/0235478 A1 * | 11/2004 | Lindquist et al. | 455/440 |

FOREIGN PATENT DOCUMENTS

| EP | 1 284 545 A1 | 2/2003 |
|---|---|---|
| WO | 2004/075459 A2 | 9/2004 |

* cited by examiner

*Primary Examiner* — Dominic E Rego
(74) *Attorney, Agent, or Firm* — Staas & Halsey LLP

(57) ABSTRACT

A first signal containing first data multiplied by a first weight factor is transmitted from a first radio station to a first terminal. The first weight factor is calculated taking into account a second weight factor to be used by a second radio station for transmission of a second signal containing the first data multiplied by the second weight factor, such that simultaneous reception of both the first signal and the second signal at the first terminal will cause the first data to be substantially cancelled. Further, the first weight vector is calculated taking into account first and second channel state information received from the first terminal.

19 Claims, 3 Drawing Sheets

METHOD FOR DATA TRANSMISSION IN A RADIO COMMUNICATION SYSTEM AS WELL AS RADIO STATION AND RADIO COMMUNICATIONS SYSTEM

CROSS REFERENCE TO RELATED APPLICATIONS

This application is based on and hereby claims priority to European Application No. EP06007061 filed on Apr. 3, 2006 and PCT Application No. PCT/EP2007/053123 filed on Mar. 30, 2007, the contents of which are hereby incorporated by reference.

BACKGROUND OF THE INVENTION

Data transmission in a radio communication system may be from a first radio station via an air interface.

For conventional joint transmission, e.g. in a radio communication system, a central unit receives data from a backbone network for all connected terminals (e.g. mobile stations), which are simultaneously scheduled to receive the data from radio stations over an air interface, and calculates dependent on the overall channel matrix H an according weighting matrix W—e.g. for zero forcing (ZF) the pseudo inverse of H for pre processing of the data before transmission. The central unit includes the common medium access control (MAC) as well as the MU-MIMO (Multi User-Minimum Input Maximum Output) pre-processing for all radio stations transmitting the data.

A cooperative antenna system based on joint transmission/joint detection, for example the service area concept as described in T. Weber, M. Meurer, W. Zirwas, "Low Complexity Energy Efficient Joint Transmission for OFDM Multiuser Downlinks", Proc. IEEE PIMRC 2004 Barcelona, Spain, is essentially a distributed MU-MIMO system involving several advantages.

Firstly a cooperative antenna system exploits the free available spatial dimension as well known for all MIMO systems. In case of spatial multiplexing the capacity may be enhanced by factors. MU-MIMO systems have the additional advantage of low cost terminals, e.g. mobile stations, which might be equipped with only one or two antenna elements.

Due to the distributed nature of e.g. the service area concept where several adjacent—but geographically far off placed—radio stations, e.g. base stations, are used as transmit antennas full macro diversity gains are available.

The most important advantage for cellular radio systems is probably the avoidance of inter cell interference (ICI) between radio stations of a service area due to the cooperation in the central unit. In conventional cellular radio communication systems the overall spectral efficiency is significantly decreased compared to the spectral efficiency of a single cell due to the ICI especially at cell border. For a service area with joint transmission ICI increases spectral efficiency even beyond that of a single isolated cell due to rank enhancement, i.e. the number of uncorrelated transmission channels and therefore the rank of the channel matrix increases.

In spite of these many advantages there is still some reluctance to apply such system concepts. One of the main reasons is the required central unit, which would require a hierarchical network structure. The vision of network planers is a flat hierarchy which allows for economy of scale for the hardware of radio stations and which is fast and easily deployable.

SUMMARY

One potential object is to provide an improved method for data transmission via an air interface in a radio communication system, which enables joint transmission even in radio communications systems with a flat hierarchy. It is a further potential object is to provide a respective first radio station as well as a respective radio communications system.

The inventors propose a method for data transmission via an air interface in a radio communication system, a first radio station and a radio communications system.

According to the proposed method for data transmission via an air interface in a radio communication system, a first signal containing at least first data multiplied by a first weight factor is transmitted from a first radio station to at least a first terminal. The first weight factor is calculated taking into account at least a second weight factor to be used by a second radio station for transmission of a second signal containing at least the first data multiplied by the second weight factor such that simultaneous reception of at least both the first signal and the second signal at the first terminal will cause the first data to be substantially cancelled. The first weight vector is calculated by the first radio station taking into account at least first and second channel state information received from the first terminal, the first channel state information relating to a first transmission channel from the first radio station to the first terminal and the second channel state information relating to a second transmission channel from the second radio station to the first terminal.

By substantially cancelling the first data at the first terminal, interference caused by first data transmitted by the second radio station can at least be reduced or even cancelled completely. If the first radio station transmits further data simultaneously with the weighted first data, the further data is received at the first terminal with at least reduced interference. Therefore decoding of the further data is facilitated.

Advantageously the first signal contains second data multiplied by a third weight factor, the third weight factor being calculated taking into account at least a fourth weight factor to be used by second radio station for transmission of the second signal additionally containing the second data multiplied by the fourth weight factor, such that simultaneous reception of at least both the first signal and the second signal at second terminal causes the second data to be substantially cancelled while the first data can be decoded by the second terminal, and the third weight factor is calculated by the first radio station taking into account third and fourth channel state information received from the second terminal, the third channel state information relating to a third transmission channel from the second radio station to second terminal and the fourth channel state information relating to a fourth transmission channel from the first radio station to the first terminal.

The first radio station is enabled to transmit the second data to the second terminal such that simultaneous reception of the second data transmitted from the second radio station substantially cancel each other out at the second station. This enables the first radio station to transmit the first data without interference to the second terminal while the second radio station transmits the second data.

Advantageously simultaneous reception of at least the first signal and the second signal enables the first terminal to decode the second data.

Advantageously the second weight factor and the fourth weight factor are calculated by the second radio station taking into account the first and second channel state information received by the first terminal and the third and fourth channel state information received by the second terminal in the same manner as being done by the first radio station to calculate the first weight factor and the third weight factor.

Advantageously the first radio station broadcasts first pilot signals to be used for channel estimation together with a first identifier of the first terminal and/or the second radio station broadcasts second pilot signals to be used for channel estimation together with a second identifier of the second terminal.

According to an embodiment the first radio station additionally broadcasts a third identifier to identify the first radio station and/or the second radio station additionally broadcasts a fourth identifier to identify the second radio station.

Advantageously the first, second, third, and fourth channel state information are received via broadcast transmissions.

Preferably third pilot signals of the first terminal and fourth pilot signals of the second terminal are received via broadcast transmissions, the third pilot signals and the fourth pilot signals being used for estimation of transmission channels from the first terminal and the second terminal to the first radio station and second radio station.

According to a further embodiment—after simultaneous reception of the first signal and the second signal at the first terminal and at the second terminal—a first feedback signal relating to an amount of interference from first data not cancelled by the simultaneous reception of the first signal and the second signal is received from the first terminal at the first radio station or/and a second feedback signal relating to an amount of interference from second data not cancelled by the simultaneous reception of the first signal and the second signal is received from the second terminal at the second radio station.

Advantageously the first radio station uses the first feedback signal to change the first weight factor for a subsequent transmission of first data multiplied by the changed first weight factor, whereas the first weight factor is changed such that the subsequent transmission would cause the first data to be completely cancelled at the first terminal provided the respective transmission channels as well as the second weight factor used by the second radio station remain unchanged or/and the second radio station uses the second feedback signal to change the fourth weight factor for a subsequent transmission of second data multiplied by the changed fourth weight factor, whereas the fourth weight factor is changed such that the subsequent transmission would cause the second data to be completely cancelled at the second terminal provided the respective transmission channels as well as the third weight factor used by the first radio station remain unchanged.

Advantageously the first feedback signal additionally indicates that the first terminal has not been able to correctly decode the second data and/or the second feedback signal additionally indicates that the second terminal has not been able to correctly decode the first data.

The proposed first radio station for a radio communications system, comprises a transmitter to transmit a first signal containing at least first data multiplied by a first weight factor from the first radio station to at least a first terminal, a processor to calculate the first weight factor taking into account at least a second weight factor to be used by a second radio station for transmission of a second signal containing at least the first data multiplied by the second weight factor, such that simultaneous reception of at least both the first signal and the second signal at the first terminal will cause the first data to be substantially cancelled. Further, the processor to calculate the first weight vector is configured such that the first weight vector is calculated taking into account at least first and second channel state information received from the first terminal, the first channel state information relating to a first transmission channel from the first radio station to the first terminal and the second channel state information relating to a second transmission channel from the second radio station to the first terminal.

The proposed radio communication system has a first radio station, a second radio station, a first terminal and a second terminal which together perform the proposed method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
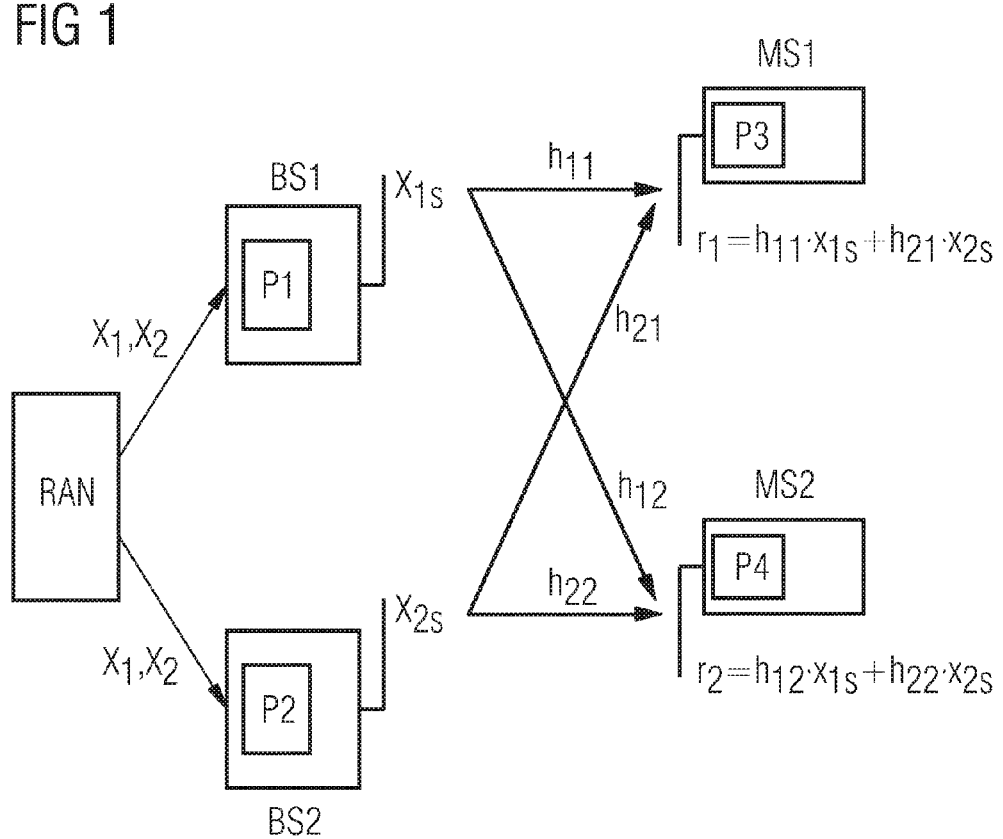
FIG. 1 schematic diagram of a proposed radio communication system.

Reference will now be made in detail to the preferred embodiments of the present invention, examples of which are illustrated in the accompanying drawings, wherein like reference numerals refer to like elements throughout.

A radio station is for example a base station of a radio communications system.

A terminal is for instance a mobile radio terminal, particularly a mobile phone or a flexible of fixed device, for transmission of picture data and/or sound data, for fax, short message service (SMS) messages and/or E-mail messages, and/or for internet access.

The method can advantageously be used in any kind of communications system. A communications system is for example a computer network or a radio communications system.

Radio communications systems are systems in which a data transmission between terminals is performed over an air interface. The data transmission can be both bidirectional and unidirectional. Radio communications systems are particularly cellular radio communication systems, e.g. according to the GSM (Global System for Mobile Communications) standard or the UMTS (Universal Mobile Telecommunication System) standard. Also future mobile radio communications systems, e.g. according to the fourth generation, as well as ad-hoc-networks shall be understood as radio communication systems. Radio communication systems are also wireless local area networks (WLAN) according to standards from the Institute of Electrical and Electronics Engineers (IEEE) like 802.11a-i, HiperLAN1 and HiperLAN2 (High Performance Radio Local Area Network) as well as Bluetooth-Networks.

In the following, the proposed method is described in a radio communication system with synchronized OFDM, i.e. all radio station and terminals are synchronized in frequency and time. But even in an unsynchronized system the method can be used, provided that radio stations and terminals involved in a joint transmission are synchronized before performing the method, e.g. by transmission of synchronization signals from a backbone network to the respective radio stations and terminals, e.g. by inserting the synchronization signals into data to be transmitted.

FIG. 1 shows a first radio station BS1 comprising a first Processor P1 and a second radio station BS2 comprising a second processor P2, the processors P1, P2 being used for controlling the respective operation, particularly data reception, data transmission and data processing, of the first radio Station BS1 and the second radio station BS2. The first radio station BS1 and the second radio station BS2 are part of a radio communication system using e.g. OFDM (Orthogonal Frequency Division Multiplex) and OFDMA (Orthogonal Frequency Division Multiple Access) for data transmission and for separation of terminals. The first radio station BS1 and the second radio station BS2 are connected via a backbone network RAN, e.g. a radio access network, using e.g. cables or fibers. Data transmission in the backbone network RAN supports multicasting of data packets and is for example based on IP (Internet Protocol), STM (Synchronous Transfer Mode), ATM (Asynchronous Transfer Mode) or Ethernet.

A first terminal MS1 is assigned to the first radio station BS1 and is supposed to receive second data $x_1$ over a first transmission channel mathematically described by a first channel state information $h_{11}$. A second terminal MS2 is assigned to the second radio station BS2 and is supposed to receive first data $x_2$ over a third transmission channel mathematically described by a third channel state information $h_{22}$. The first terminal MS1 comprises a third processor P3 and the second terminal MS2 comprises a fourth processor P4, the processors P3, P4 being used for controlling operation of the first terminal MS1 and the second terminal MS2. The first terminal MS1 will also receive signals transmitted from the second radio station BS2 to the second terminal MS2 over a second transmission channel mathematically described by a second channel state information $h_{21}$. Further, the second terminal MS2 will receive signals transmitted from the first radio station BS1 to the first terminal MS1 over a fourth transmission channel mathematically described by a fourth channel state information $h_{12}$.

To substantially cancel interference caused by first data $x_2$ at the first terminal MS1 and caused by second data $x_1$ at the second terminal MS2, joint transmission is used. The first radio station BS1 transmits a first signal $x_{1s}$ containing the second data $x_1$ multiplied by a third weight factor $w_{11}$ and the first data $x_2$ multiplied by a first weight factor $w_{21}$ while the second radio station BS2 simultaneously transmits a second signal containing the first data $x_2$ multiplied by a second weight factor $w_{22}$ and the second data $x_1$ multiplied by a fourth weight factor $w_{12}$. So as a first step the first radio station BS1 and the second radio station BS2 both have to store the first data and the second data e.g. in a FIFO (First In First Out) memory. For this purpose a multicast connection is installed from the backbone network RAN to the first radio station BS1 and the second radio station BS2. Because no central unit is present, each radio station BS1, BS2 calculates its weight matrix containing the weight factors $w_{11}, w_{12}, w_{21}, w_{22}$ independently.

The main formulas (1) for a 2×2 joint transmission system e.g. with zero forcing according to FIG. 1 is given below (all variables complex):

$$x_{1s} = w_{11} \cdot x_1 + w_{21} \cdot x_2; x_{2s} = w_{12} \cdot x_1 + w_{22} \cdot x_2 \quad (1)$$

$$r_1 = h_{11} \cdot x_{1s} + h_{21} \cdot x_{2s}; r_2 = h_{12} \cdot x_{1s} + h_{22} \cdot x_{2s}$$

$$\begin{bmatrix} r_1 \\ r_2 \end{bmatrix} = \begin{bmatrix} h_{11} \cdot w_{11} + h_{21} \cdot w_{12} & h_{11} \cdot w_{21} + h_{21} \cdot w_{22} \\ h_{12} \cdot w_{11} + h_{22} \cdot w_{12} & h_{12} \cdot w_{21} + h_{22} \cdot w_{22} \end{bmatrix} \cdot \begin{bmatrix} x_1 \\ x_2 \end{bmatrix}$$

-continued
$$w_{22} = -\frac{h_{11}}{h_{21}} \cdot w_{21}; w_{12} = -\frac{h_{12}}{h_{22}} \cdot w_{11}$$

A first receive signal at the first terminal MS1 is given by $r_1$ and a second receive signal at the second terminal MS2 is given by $r_2$. The first receive signal and the second receive signal are for simplicity given without noise but the method is certainly equivalently applicable with noise.

The goal of the zero forcing joint transmission is to maximize for $^T$ the diagonal elements and to set the off-diagonal elements (interference terms) to zero. To calculate the weight factors $w_{11}, w_{12}, w_{21}, w_{22}$ each radio station BS1, BS2 has to estimate all radio channels from each radio station BS1, BS2 to each terminal MS1, MS2, i.e. all channel state information $h_{11}, h_{12}, h_{21}, h_{22}$.

For clarity reasons, the method is described with two radio stations and two terminals each having one antenna for transmission and reception. The method is certainly not limited to this number of radio stations and terminals and can be equivalently implemented with more than two radio stations and more than two terminals each having more than one antenna for transmission and/or reception. In this case only the matrices used for calculations will have additional rows and or columns representing the additional radio stations, terminals and/or antennas.

Figure 2:
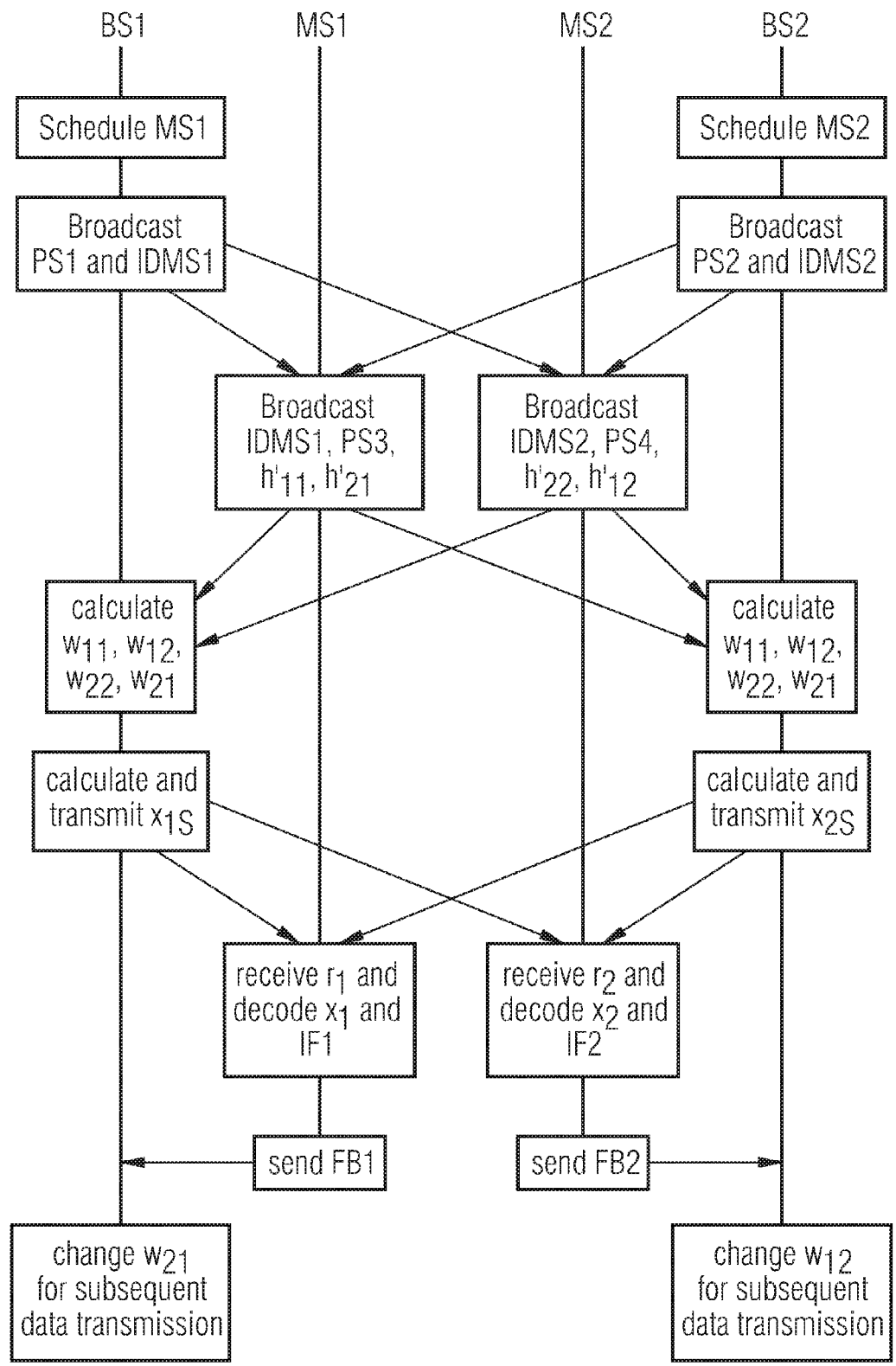
FIG. 2 schematic timing diagram showing the proposed method in a radio communication system according to FIG. 1, FIG. 3 schematic diagram of pilot signals used by radio stations according to FIG. 2, and FIG. 4 schematic diagram of pilot signals used by terminals according to FIG. 2.

A time diagram including channel estimation and joint transmission is shown in FIG. 2. Besides channel estimation autonomous scheduling at the first and second radio station BS1, BS2 is a major challenge of the distributed approach. To accomplish this, the MAC layer and the physical layer are separated.

In a first step the first radio station BS1 decides to schedule the first terminal MS1 for reception of the second data $x_1$ in a first transmission time interval (TTI) while the second radio station BS2 decides to schedule the second terminal for reception of the first data $x_2$ in the first transmission time interval. The decision which terminal is scheduled in the first transmission time interval is taken independently by the first and the second radio station BS1, BS2 and depends e.g. from parameters as channel quality, quality of service classes of terminals or buffer length of a buffer used to store data to be transmitted.

Figure 3:
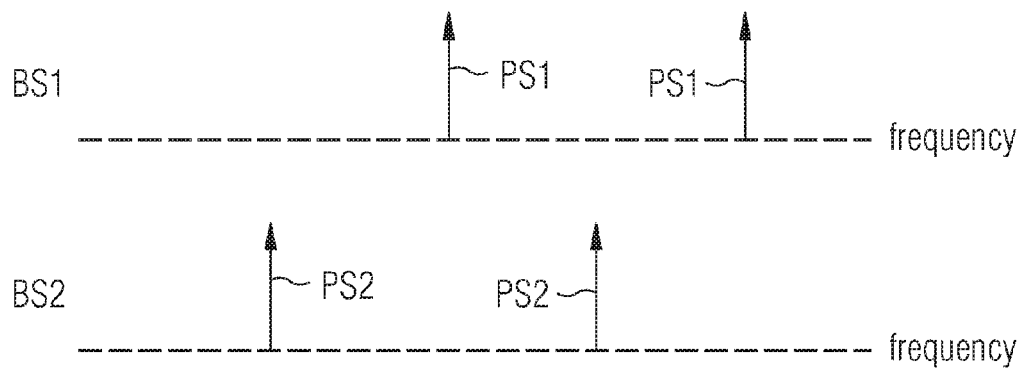

In a next step the first radio station BS1 broadcasts first pilot signals PS1 to be used for channel estimation together with a first identifier IDMS1 of the first terminal MS1 which indicates the first terminal MS1 to be scheduled in the first transmission time interval while the second radio station BS2 broadcasts second pilot signals PS2 to be used for channel estimation together with a second identifier IDMS2 of the second terminal MS2 which indicates the second terminal MS2 to be scheduled in the first transmission time interval. The first and second pilot signals PS1, PS2 are for example orthogonal pilot grids as shown in FIG. 3, i.e. the first and second pilot signals PS1, PS2 use different sub-carriers. It is certainly also possible to use more or even less than two sub-carriers as first and/or second pilot signals PS1, PS2.

According to FIG. 3 orthogonal pilot grids are used to enable the first and second terminal to distinguish pilot signals of the first and second radio station. According to another embodiment, not shown in the figures, a third identifier to identify the first radio station BS1 and a fourth identifier to identify the second radio station BS2 is additionally broadcasted by the first and second radio station BS1, BS2 respectively instead of orthogonal pilot grids used according to FIG. 3.

Figure 4:
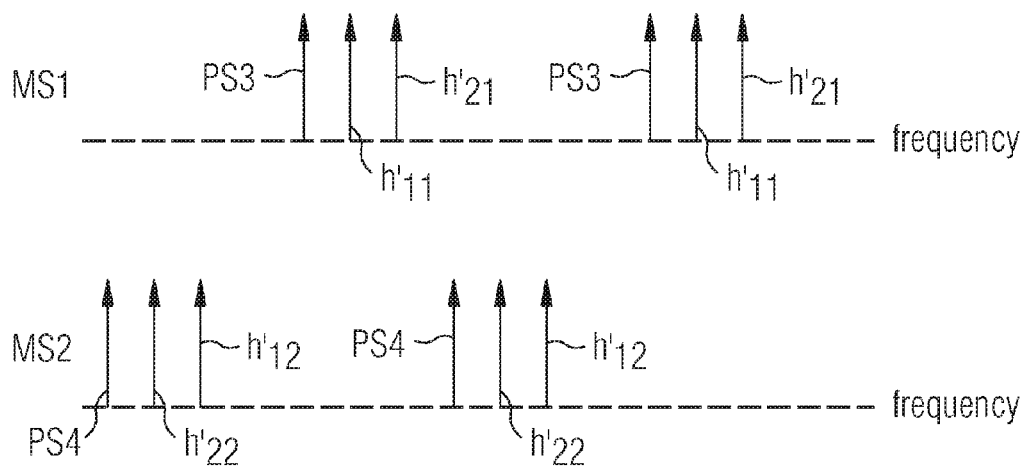

Reception of the first and second pilot signals PS1, PS2 provides the first terminal MS1 with a first and second analogue receive signals $h'_{11}$ and $h'_{21}$ which can be used to estimate the first and second channel state information $h_{11}$ and $h_{21}$. The second terminal MS2 is provided with third and fourth analogue receive signals $h'_{22}$ and $h'_{12}$ which can be used to estimate the third and fourth channel state information $h_{22}$ and $h_{12}$. In the following step the first and second terminal MS1, MS2 broadcast their analogue receive signals $h'_{11}$, $h'_{21}$, $h'_{22}$ and $h'_{12}$ together with own pilot signals PS3, PS4 over orthogonal pilot grids according to FIG. 4. Additionally the first terminal MS1 transmits the first identifier IDMS1 and the second terminal MS2 transmits the second identifier IDMS2. Further, information is broadcasted which enables the first and second radio station BS1, BS2, to identify from which pilot signals PS1, PS2 a broadcasted analogue receive signal originates, e.g. a respective identifier of the first or second radio station BS1, BS2 is broadcasted together with the respective analogue receive signal (not shown in the figure).

As especially the transmission channels from the first radio station BS1 to the second terminal MS2 and from the second radio station BS2 to the first terminal MS1 might be weak, having e.g. high path losses, the broadcasts send by the first and second terminal MS1, MS2 can use higher power than regular data transmission, e.g. +20 dB, and/or a more robust transmission mode, e.g. by repetition of the broadcast over several time frames or sub-carriers, can be chosen.

The first and second radio station BS1, BS2 each performs an estimation of all channel state information $h_{11}, h_{12}, h_{21}, h_{22}$ and calculates the four weight factors $w_{11}, w_{12}, w_{21}, w_{22}$. The first radio station BS1 calculates and transmits the first signal $x_{1s}$ and the second radio station BS2 calculates and transmits the second signal $x_{2s}$, e.g. according to formulas (1). The first terminal MS1 simultaneously receives the first and the second signal $x_{1s}, x_{2s}$ as the first receive signal $r_1$, decodes the second data $x_1$ and measures a first interference value IF1 relating to interference from the first data $x_2$ contained in the first receive signal $r_1$. The second terminal MS2 simultaneously receives the first and the second signal $x_{1s}, x_{2s}$ as the second receive signal $r_2$, decodes the first data $x_2$ and measures a second interference value IF2 relating to interference from the second data $x_1$ contained in the second receive signal $r_2$. A measure for the respective interference value is e.g. the variance of the respective receive signal in respect of constellation points according to a modulation scheme (e.g. $2^n$ QAM) used for data transmission. Additionally or alternatively, the terminals can be provided with predefined time slots in each of which data is only transmitted from one radio station to a single terminal, so that measurements at the other terminals give directly the respective interference value. The number of predefined time slots has to be the same as the number of terminals involved in the joint transmission. It is further possible to use predefined time slots in which a terminal retransmits an analogue receive signal back to its serving radio station, the analogue receive signal relating to data transmitted beforehand from its serving radio station. The serving radio station knows which data it has transmitted and therefore can calculate the interference contained in the analogue receive signal after having estimated the data. Instead of the analogue receive signal, the terminal can preferably estimate the data itself, retransmit the estimated data and by comparison of estimated data and transmitted data, the serving radio station can calculate the interference, e.g. a respective correction vector.

As the first and second signal are not calculated by a central unit it is possible that the first and second radio station BS1, BS2 calculate different channel state information $h_{11}, h_{12}, h_{21}, h_{22}$ and therefore also different weight factors $w_{11}, w_{12}, w_{21}, w_{22}$. This results in the first and second interference values IF1, IF2 measured by the first and second terminal MS1, MS2.

The first terminal MS1 transmits a first feedback signal FB1 related to the first interference value IF1 to the first radio station BS1, e.g. using a dedicated channel. The first feedback signal FB1 is either the first interference value IF1 itself or it is used by the first radio station BS1 to calculate the first interference value IF1. According to the interference deduced from the first feedback value the first radio station BS1 changes the first weight factor $w_{21}$ for a subsequent transmission of first data, e.g. in the next transmission time interval, such that the subsequent transmission would cause the first data to be completely cancelled at the first terminal MS1 provided the respective transmission channels as well as the second weight factor $w_{22}$ used by the second radio station remain unchanged.

The second terminal MS2 transmits a second feedback signal FB2 related to the second interference value IF2 to the second radio station BS1, e.g. using a dedicated channel. The second feedback signal FB2 is either the second interference value IF2 itself or it is used by the second radio station BS2 to calculate the second interference value IF2. According to the interference deduced from the second feedback value FB2 the second radio station BS2 changes the fourth weight factor $w_{12}$ for a subsequent transmission of second data, e.g. in the next transmission time interval, such that the subsequent transmission would cause the second data to be completely cancelled at the second terminal MS2 provided the respective transmission channels as well as the third weight factor $w_{11}$ used by the first radio station BS1 remain unchanged.

First data and/or second data transmitted in the subsequent transmission is either the first and/or second data $x_2, x_1$ transmitted in the first time interval or new data supposed to be received substantially interference free at the first and the second terminal respectively.

Transmission of first and second feedback signals FB1, FB2 can be done after each reception of data by the terminals, but to reduce signalling load it is preferred to transmit first and/or second feedback signals regularly but not in every transmission time interval.

A time scale usable for transmission of first and/or second feedback signals is implicitly given, if the feedback signals additionally indicate if a retransmission of the first and second data is necessary. To enable retransmission of the first and second data $x_2, x_1$ an embodiment not shown in the figures uses the first and second feedback signals additionally as NACK (Not-Acknowledged) messages, whereas reception of a feedback signal indicates to the respective radio station BS1, BS2 that the first terminal MS1 has not been able to correctly decode the second data $x_1$ and that the second terminal MS2 has not been able to decode the first data $x_2$. After reception of a feedback signal the respective radio station changes the according weight factor and retransmits the data which has not been correctly decoded. In this embodiment feedback signals are only transmitted, if decoding in the respective terminal failed. No transmission and therefore no reception of feedback signals indicate the respective radio station that the respective data has been correctly decoded.

It should be mentioned that this proposal supports TDD (Time Division Duplex) as well as FDD (Frequency Division Duplex) radio communication systems. For TDD the pilot signals of the terminals can be used to directly estimate channel state information for the respective downlink channels while for FDD the pilot signals are used for determining the uplink channels of the terminals for correctly detecting e.g.

the analogue receive signals or for correctly decoding the estimated channel state information which in both cases are retransmitted by the terminals The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for data transmission via an air interface in a radio communication system, comprising:

transmitting a first signal from a first radio station to at least first and second terminals, the first signal containing at least first and second data, the first data being multiplied by a first weight factor before transmission from first radio station, the second data being multiplied by a third weight factor before transmission from the first radio station;

calculating the first weight factor taking into account a second weight factor used by a second radio station for transmission of a second signal containing at least the first and second data, the second radio station multiplying the first data by the second weight factor before transmission, the first weight factor being calculated such that simultaneous reception of both the first signal and the second signal at the first terminal cause the first data to be substantially cancelled;

receiving first and second channel state information from the first terminal via broadcast transmissions, the first weight vector being calculated by the first radio station taking into account the first and second channel state information, the first channel state information relating to a first transmission channel from the first radio station to the first terminal and the second channel state information relating to a second transmission channel from the second radio station to the first terminal;

calculating the third weight factor taking into account a fourth weight factor used by the second radio station for transmission of the second signal, the second radio station multiplying the second data by the fourth weight factor weight factor before transmission, the third weight factor being calculated such that simultaneous reception of both the first signal and the second signal at the second terminal causes the second data to be substantially cancelled while the first data can be decoded;

receiving third and fourth channel state information from the second terminal via broadcast transmissions, and the third weight factor being calculated by the first radio station taking into account the third and fourth channel state information, the third channel state information relating to a third transmission channel from the second radio station to the second terminal and the fourth channel state information relating to a fourth transmission channel from the first radio station to the second terminal.

2. The method according to claim 1, wherein
simultaneous reception of the first signal and the second signal enables the first terminal to decode the second data.

3. The method according to claim 2, wherein
the second weight factor and the fourth weight factor are calculated by the second radio station taking into account the first and second channel state information received from the first terminal and the third and fourth channel state information received from the second terminal in a manner analogous to that used by the first radio station to calculate the first weight factor and the third weight factor.

4. The method according to claim 3, wherein
the first radio station broadcasts first pilot signals for channel estimation together with a first identifier of the first terminal and/or the second radio station broadcasts second pilot signals for channel estimation together with a second identifier of the second terminal.

5. The method according to claim 4, wherein
the first radio station additionally broadcasts a third identifier to identify the first radio station and/or the second radio station additionally broadcasts a fourth identifier to identify the second radio station.

6. The method according to claim 5, wherein
third pilot signals are received from the first terminal via broadcast transmissions,
fourth pilot signals are received from the second terminal via broadcast transmissions, and
the third pilot signals and the fourth pilot signals are used for estimation of transmission channels from the first terminal and the second terminal to the first radio station and second radio station.

7. The method according to claim 6, wherein
after simultaneous reception of the first signal and the second signal at the first terminal and at the second terminal, a first feedback signal relating to an amount of interference from first data not cancelled by the simultaneous reception of the first signal and the second signal is received from the first terminal at the first radio station or/and a second feedback signal relating to an amount of interference from second data not cancelled by the simultaneous reception of the first signal and the second signal is received from the second terminal at the second radio station.

8. The method according to claim 7, wherein
the first radio station uses the first feedback signal to change the first weight factor for a subsequent transmission of first data multiplied by the changed first weight factor, the first weight factor being changed such that the subsequent transmission causes the first data to be completely cancelled at the first terminal if the respective transmission channels as well as the second weight factor used by the second radio station remain unchanged or/and
the second radio station uses the second feedback signal to change the fourth weight factor for a subsequent transmission of second data multiplied by the changed fourth weight factor, the fourth weight factor being changed such that the subsequent transmission causes the second data to be completely cancelled at the second terminal if the respective transmission channels as well as the third weight factor used by the first radio station remain unchanged.

9. The method according to claim 8, wherein
the first feedback signal additionally indicates that the first terminal has not been able to correctly decode the second data and/or
the second feedback signal additionally indicates that the second terminal has not been able to correctly decode the first data.

10. The method according to claim 1, wherein
the second weight factor and the fourth weight factor are calculated by the second radio station taking into account the first and second channel state information received from the first terminal and the third and fourth channel state information received from the second terminal in a manner analogous to that used by the first radio station to calculate the first weight factor and the third weight factor.

11. The method according to claim 1, wherein
the first radio station broadcasts first pilot signals for channel estimation together with a first identifier of the first terminal and/or the second radio station broadcasts second pilot signals for channel estimation together with a second identifier of the second terminal.

12. The method according to claim 11, wherein
the first radio station additionally broadcasts a third identifier to identify the first radio station and/or the second radio station additionally broadcasts a fourth identifier to identify the second radio station.

13. The method according to claim 1, wherein
third pilot signals are received from the first terminal via broadcast transmissions,
fourth pilot signals are received from the second terminal via broadcast transmissions, and
the third pilot signals and the fourth pilot signals are used for estimation of transmission channels from the first terminal and the second terminal to the first radio station and second radio station.

14. The method according to claim 1, wherein
after simultaneous reception of the first signal and the second signal at the first terminal and at the second terminal, a first feedback signal relating to an amount of interference from first data not cancelled by the simultaneous reception of the first signal and the second signal is received from the first terminal at the first radio station or/and a second feedback signal relating to an amount of interference from second data not cancelled by the simultaneous reception of the first signal and the second signal is received from the second terminal at the second radio station.

15. The method according to claim 14, wherein
the first radio station uses the first feedback signal to change the first weight factor for a subsequent transmission of first data multiplied by the changed first weight factor, the first weight factor being changed such that the subsequent transmission causes the first data to be completely cancelled at the first terminal if the respective transmission channels as well as the second weight factor used by the second radio station remain unchanged or/and
the second radio station uses the second feedback signal to change the fourth weight factor for a subsequent transmission of second data multiplied by the changed fourth weight factor, the fourth weight factor being changed such that the subsequent transmission causes the second data to be completely cancelled at the second terminal if the respective transmission channels as well as the third weight factor used by the first radio station remain unchanged.

16. The method according to claim 14, wherein
the first feedback signal additionally indicates that the first terminal has not been able to correctly decode the second data and/or
the second feedback signal additionally indicates that the second terminal has not been able to correctly decode the first data.

17. A radio communications system, comprising first and second radio stations and first and second terminals to perform the method according to claim 1.

18. A first radio station for a radio communications system, comprising:
a transmitter to transmit a first signal to at least first and second terminals, the first signal containing at least first and second data, the first data being multiplied by a first weight factor before transmission from first radio station, the second data being multiplied by a third weight factor before transmission from the first radio station;
a processor to:
calculate the first weight factor taking into account a second weight factor used by a second radio station for transmission of a second signal containing at least the first and second data, the second radio station multiplying the first data by the second weight factor before transmission, the first weight factor being calculated such that simultaneous reception of both the first signal and the second signal at the first terminal cause the first data to be substantially cancelled; and
calculate the third weight factor taking into account a fourth weight factor used by the second radio station for transmission of the second signal, the second radio station multiplying the second data by the fourth weight factor weight factor before transmission, the third weight factor being calculated such that simultaneous reception of both the first signal and the second signal at the second terminal causes the second data to be substantially cancelled while the first data can be decoded;
a receiver to:
receive first and second channel state information from the first terminal via broadcast transmissions, the first weight vector being calculated by the first radio station taking into account the first and second channel state information, the first channel state information relating to a first transmission channel from the first radio station to the first terminal and the second channel state information relating to a second transmission channel from the second radio station to the first terminal; and
receive third and fourth channel state information from the second terminal via broadcast transmissions, the third weight factor being calculated by the first radio station taking into account the third and fourth channel state information, the third channel state information relating to a third transmission channel from the second radio station to the second terminal and the fourth channel state information relating to a fourth transmission channel from the first radio station to the second terminal.

19. A first radio station according to claim 18, wherein
simultaneous reception of the first signal and the second signal enables the first terminal to decode the second data,
the second weight factor and the fourth weight factor are calculated by the second radio station taking into account the first and second channel state information received from the first terminal and the third and fourth channel state information received from the second terminal in a manner analogous to that used by the first radio station to calculate the first weight factor and the third weight factor,
the first radio station broadcasts first pilot signals for channel estimation together with a first identifier of the first terminal and the second radio station broadcasts second pilot signals for channel estimation together with a second identifier of the second terminal, the first radio station additionally broadcasts a third identifier to identify the first radio station and the second radio station additionally broadcasts a fourth identifier to identify the second radio station, third pilot signals are received from the first terminal via broadcast transmissions, fourth pilot signals are received from the second terminal via broadcast transmissions, the third pilot signals and the fourth pilot signals are used for estimation of transmission channels from the first terminal and the second terminal to the first radio station and second radio station, after simultaneous reception of the first signal and the second signal at the first terminal and at the second terminal, a first feedback signal relating to an amount of interference from first data not cancelled by the simultaneous reception of the first signal and the second signal is received from the first terminal at the first radio station or/and a second feedback signal relating to an amount of interference from second data not cancelled by the simultaneous reception of the first signal and the second signal is received from the second terminal at the second radio station, the first radio station uses the first feedback signal to change the first weight factor for a subsequent transmission of first data multiplied by the changed first weight factor, the first weight factor being changed such that the subsequent transmission causes the first data to be completely cancelled at the first terminal if the respective transmission channels as well as the second weight factor used by the second radio station remain unchanged or/and the second radio station uses the second feedback signal to change the fourth weight factor for a subsequent transmission of second data multiplied by the changed fourth weight factor, the fourth weight factor being changed such that the subsequent transmission causes the second data to be completely cancelled at the second terminal if the respective transmission channels as well as the third weight factor used by the first radio station remain unchanged, the first feedback signal additionally indicates that the first terminal has not been able to correctly decode the second data, and the second feedback signal additionally indicates that the second terminal has not been able to correctly decode the first data.

* * * * *

UNITED STATES PATENT AND TRADEMARK OFFICE
CERTIFICATE OF CORRECTION

| | | |
|---|---|---|
| PATENT NO. | : 8,036,691 B2 | |
| APPLICATION NO. | : 12/226001 | |
| DATED | : October 11, 2011 | |
| INVENTOR(S) | : Jee Hyun Kim et al. | |

It is certified that error appears in the above-identified patent and that said Letters Patent is hereby corrected as shown below:

Title Page, Column 1 item (73) (Assignee), Line 1, Delete "Co" and insert --Co.--, therefor.

Column 9, Line 44, In Claim 1, after "factor" delete "weight factor".

Column 12, Line 24, In Claim 18, after "factor" delete "weight factor".

Signed and Sealed this
Twentieth Day of December, 2011

David J. Kappos
*Director of the United States Patent and Trademark Office*